United States Patent
Dorrity

(10) Patent No.: US 9,585,379 B2
(45) Date of Patent: Mar. 7, 2017

(54) ADJUSTABLE HUNTER'S TREE STAND ASSEMBLY

(71) Applicant: Richard J. Dorrity, New Orleans, LA (US)

(72) Inventor: Richard J. Dorrity, New Orleans, LA (US)

( * ) Notice: Subject to any disclaimer, the term of this patent is extended or adjusted under 35 U.S.C. 154(b) by 0 days.

(21) Appl. No.: 15/148,652

(22) Filed: May 6, 2016

(65) Prior Publication Data

US 2016/0295850 A1    Oct. 13, 2016

Related U.S. Application Data

(63) Continuation-in-part of application No. 14/468,932, filed on Aug. 26, 2014, now Pat. No. 9,357,762.

(51) Int. Cl.
*A01M 31/02* (2006.01)
*E04H 15/04* (2006.01)

(52) U.S. Cl.
CPC .......... *A01M 31/02* (2013.01); *E04H 15/04* (2013.01)

(58) Field of Classification Search
CPC .................................................. A01M 31/02
See application file for complete search history.

(56) References Cited

U.S. PATENT DOCUMENTS

| | | | |
|---|---|---|---|
| 4,337,844 A | 7/1982 | Hice, Sr. | |
| 4,723,630 A | 2/1988 | Wolford et al. | |
| 4,834,217 A * | 5/1989 | Manes | A45F 3/26 108/152 |
| 5,000,210 A * | 3/1991 | Worthington, Jr. | A47C 7/66 135/90 |
| 5,143,176 A | 9/1992 | Burdette | |
| 5,240,020 A * | 8/1993 | Byers | A47C 7/66 135/155 |
| 5,297,656 A * | 3/1994 | Amacker | A01M 31/02 182/187 |
| 5,316,104 A | 5/1994 | Amacker | |
| 5,685,395 A | 11/1997 | Nelson | |
| 5,887,676 A | 3/1999 | Harbin | |
| 5,954,158 A | 9/1999 | Concepcion | |
| 6,095,172 A * | 8/2000 | Trapp | A47C 1/143 135/128 |
| 6,161,359 A * | 12/2000 | Ono | E04G 11/48 14/75 |
| 6,243,979 B1 * | 6/2001 | Seats | A01M 31/025 182/135 |
| 6,308,801 B1 | 10/2001 | Futch | |
| 6,988,588 B2 | 1/2006 | Prejean | |
| 7,306,074 B2 | 12/2007 | Voorhies | |
| 7,370,728 B1 | 5/2008 | Mann | |

(Continued)

FOREIGN PATENT DOCUMENTS

CA    2846944 A1 *    9/2014    ............ A01M 31/02

*Primary Examiner* — Alvin Chin-Shue
(74) *Attorney, Agent, or Firm* — Keaty Law Fim, LLC

(57) ABSTRACT

A hunter's tree stand has a longitudinally adjustable main frame, a standing platform suspended from the main frame, a seat, and a collapsible canopy cover pivotally engaged with the main frame. The main frame has two parallel rails and a plurality of cross bars extending transversely between the rail. An archery bow holder and a pair of gun holders are detachably supported by the rails. The standing platform is attached to the rails using telescoping struts.

2 Claims, 16 Drawing Sheets

(56) References Cited

U.S. PATENT DOCUMENTS

| | | |
|---|---|---|
| 7,748,497 B2 | 7/2010 | Tolliver et al. |
| 7,849,964 B2 | 12/2010 | Amacker et al. |
| 8,381,876 B1 | 2/2013 | Darden |
| 2002/0139615 A1* | 10/2002 | Penz .............. A01M 31/02 182/136 |
| 2004/0211625 A1* | 10/2004 | George .......... A01M 31/02 182/187 |
| 2006/0169538 A1 | 8/2006 | Louk et al. |
| 2014/0332315 A1* | 11/2014 | Moore ............ A01M 31/02 182/129 |
| 2015/0115114 A1* | 4/2015 | White ............ A01M 31/02 248/201 |

* cited by examiner

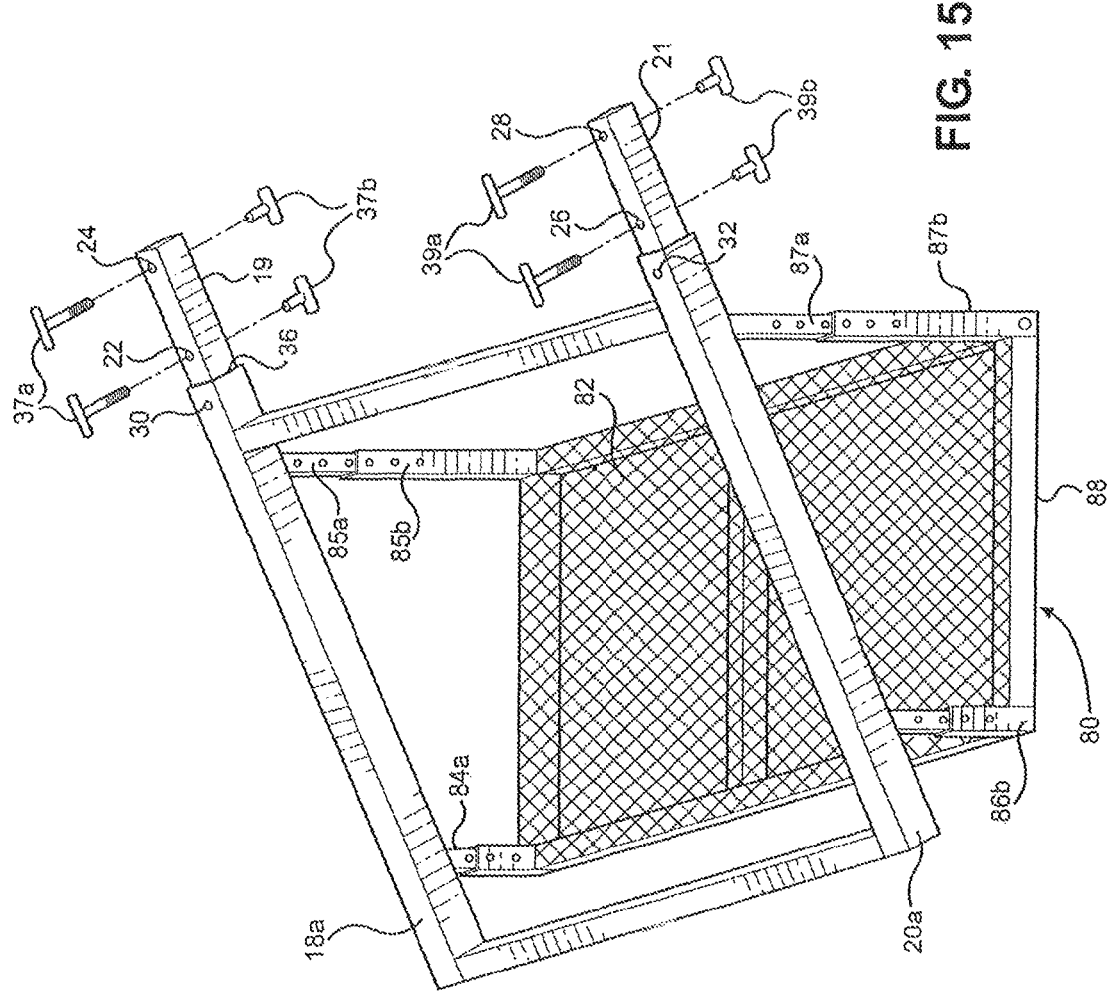

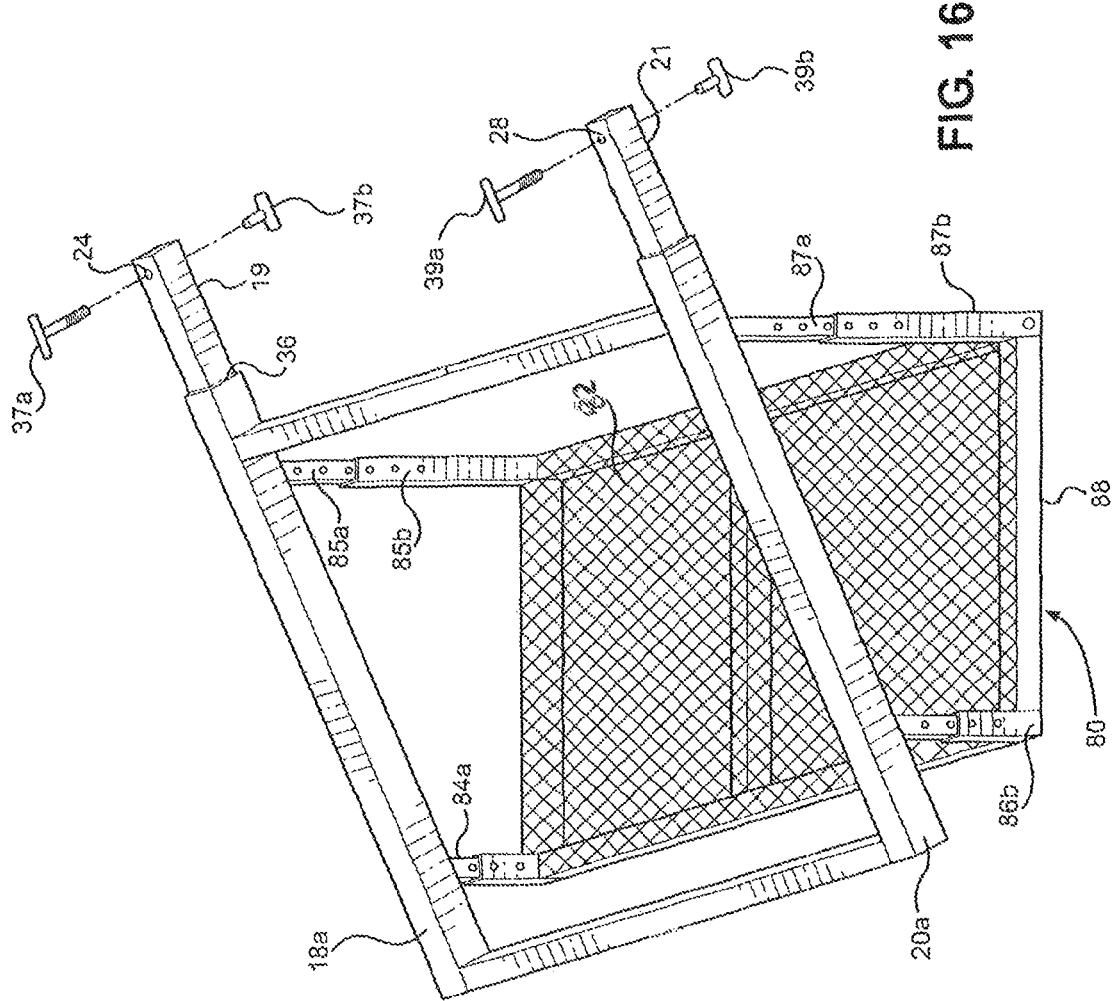

ADJUSTABLE HUNTER'S TREE STAND ASSEMBLY

CROSS-REFERENCE TO RELATED APPLICATIONS

This application is a continuation-in-part of my application Ser. No. 14/468,932 filed on Aug. 26, 2014, now U.S. Pat. No. 9,357,762, entitled "Hunter's Tree Stand Assembly," the full disclosure of which is incorporated by reference herein and priority of which is hereby claimed.

BACKGROUND OF THE INVENTION

This invention relates to a tree stand and, more particularly, to a tree stand that can be used for supporting hunters, wild life watchers, photographers, and the like on a tree.

Tree stands are generally well known in the sport of hunting. The tree stands typically include a hunter support platform made of wood or plywood. The tree stand is secured to a tree at some distance above the ground, and a mechanism, such as a ladder, is used to allow the hunter to climb up to, and down from, the tree stand. A conventional tree stand can be either permanently or detachably positioned on the tree. The tree stand may include a seat, a rifle or bow support, or even a blind to conceal the hunter. Most of the tree stands require assistance of several persons to erect and take down.

In response to the need for a single-person operation, there has been proposed a number of portable stands, which usually combine a ladder with a small platform attached to the top of the ladder. The hunter leans the ladder against a large tree and climbs to the platform which can be 10-20 feet above the ground. Needless to say, such tree stands are inherently unsafe.

Other solutions provide for the use of a platform, which is permanently attached to a tree, and a plurality of spaced-apart brackets attached to the tree. The brackets serve as steps for the hunter to climb in order to reach the platform.

Still other solutions provide for the use of a tree stand and a tree climber attachment, which the hunter moves with his feet while advancing up the tree. These stands, while advantageous in many respects, are often made of separate foldable and telescoping parts. As these tree stands are put in use, the noise of the unfolding telescoping parts scares the wildlife. The majority of tree stands support a hunter in a sitting position; they are equipped with a seat and sometimes with a foot rest, which is positioned at an angle to the seat. In such position, a hunter may find it impossibly difficult to shoot an arrow or make a gun shot from a standing position.

It is also noted that hunter may spend considerable amount of time waiting for game. In inclement weather, conventional tree stands offer little to no protection from the elements.

The present invention contemplates elimination of these and other drawbacks associated with conventional tree stands and provision of an easy-to-manufacture and easy-to-use tree stand that a single hunter can position on a tree by using a moveable tree-climber unit.

SUMMARY OF THE INVENTION

It is, therefore, an object of the present invention to provide a tree stand that can support a person above the ground on a tree.

It is another object of the invention to provide a tree stand assembly that is provided with a seating area, a detachable canopy, detachable weapon support devices, and a tree climber unit movable separately from the tree stand by a single person.

It is a further object of the invention to provide an adjustable tree stand assembly that can be extended in longitudinal manner to accommodate different height individuals.

These and other objects of the invention are achieved through a provision of a tree stand assembly, which comprises a tree stand member, a standing platform, a seat member and a tree engaging portion. The tree stand member is formed as a frame with two parallel rails and a plurality of cross bars secured transversely between the rails. Coupling members telescopically inserted in the rails allow longitudinal extension of the rails to accommodate different height individuals, The standing platform is suspended from the rails below the seat member using a plurality of vertical struts. Each strut has a two-part construction with telescopically movable portions, which allows movement of the platform up and down for user's comfort. The platform has a planar plate suitable for standing if necessary. A reinforcement bar may be attached to the underside of the plate.

The tree stand is provided with a collapsible cover assembly, which is pivotally attached to the rails and is adapted for extending above the seat and protect the user from elements. A pair of gun holders and an archery bow holder are detachably engaged with the rails.

The assembly has a tree climber member detachably coupled to the tree stand member and configured to engage the tree below the tree stand member. The hunter uses the tree climber member as a platform gradually moving the tree climber member up the tree and pulling the tree stand to the desired height above ground.

BRIEF DESCRIPTION OF THE DRAWINGS

Reference will now be made to the drawings, wherein like parts are designated by like numerals, and wherein:

FIG. 15 is a perspective view of the standing platform illustrating engagement of the side rail coupling members with the side rails using locking bolts; and FIG. 16 is a perspective view of the standing platform wherein lower bolts are not required.

DETAILED DESCRIPTION OF THE INVENTION

Figure 1:
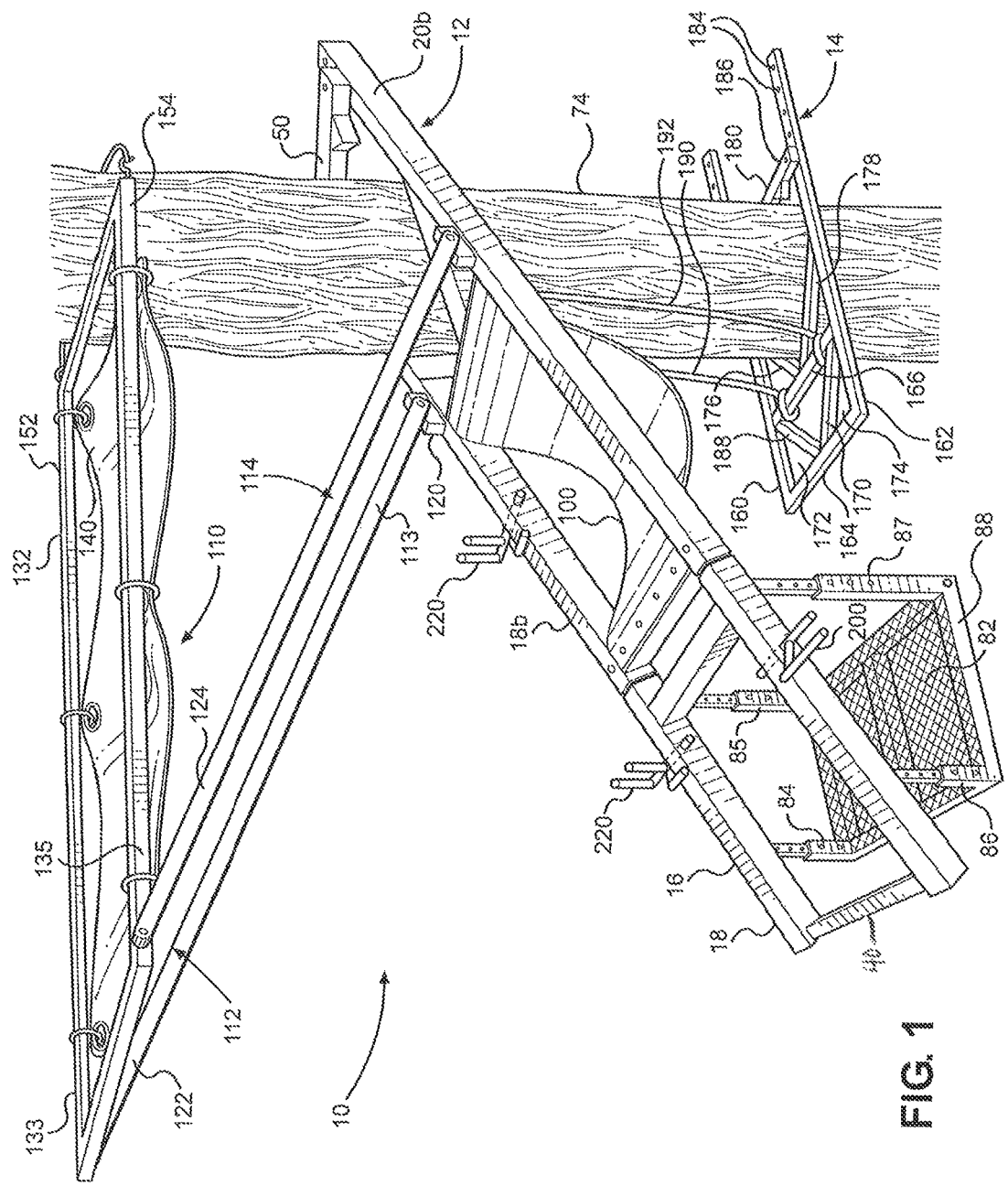
FIG. 1 is a perspective view of the adjustable tree stand assembly according to the present invention.

Turning now to the drawings in more detail, numeral 10 designates the hunter's tree stand assembly according to the present invention. The assembly 10 comprises a tree stand member 12 and a tree climber member 14. The tree stand member 12 comprises an open main frame 16 formed by a pair of elongated parallel rails 18, 20 retained in the spaced-apart relationship by a plurality of cross bars.

The rails 18 and 20 are longitudinally adjustable. The first rail 18 has a bottom part 18a and an upper part 18b; the tail 20 has a bottom part 20a and an upper part 20b. The rails 18 and 20 are hollow in at least a portion of their interior to receive a coupling member. The rail 18 is provided with an elongated rail coupling member 19, and the rail 20 is provided with an elongated rail coupling member 21.

The rail coupling member 19 has a pair of spaced-apart openings 22, 24, and the rail coupling member 21 has a pair of spaced apart openings 26, 28. The bottom rail part 18a of the first rail 18 has an opening 30, while the bottom rail part 20a of the second rail 20 has an opening 32. The upper rail part 18b of the first rail 18 has an opening 34 and the upper rail part 20b of the second rail 20 has an opening 36. The coupling members 19 and 21 are designed to fit into adjoining parts of the rails 18a, 18b and 20a, 20b, respectively, when the user desires to extend the length of the rails to accommodate the user's height and make it more comfortable for the user.

The rail coupling member 19 is inserted into an open end 36 of the bottom rail part 18a of the first rail 18 and is secured by a bolt-and-nut unit 37 and 37b. The bolt 37a passes through aligned openings 22, 30 of the rail coupling member 19 and the bottom rail part 18a, and the bolt 37b secures the bolt 37a underside of the rail part 18a (20a). The rail coupling member 21 is inserted into an open end 38 of the bottom rail part 20a of the second rail 20 and is secured therewith with a bolt-and-nut unit 39a and 39b by passing the bolt 39a through aligned openings 26, 32 of the rail coupling member 21 and the bottom rail part 20a. The nut 39b secures the bolt 39b underside of the rails.

A similar connection is made between the rail coupling member 19 and the upper rail part 18b of the rail 18. A bolt is inserted into aligned openings 24, 34 of the rail coupling member 19 and the upper rail part 18b, after which the bolt is tightened to secure the rail coupling member 19 with the upper rail part 18b. The process is repeated for the rail coupling member 21 by inserting a bolt through aligned opening 28, 36 of the rail coupling member 21 and the upper rail part 20b while the rail coupling members 19, 21 are inserted into open ends 35, 37 of the upper parts 18b, 20b of the first rail member 18 and the second rail member 20, respectively. The use of the rail coupling members 19, 21 allows lowering of the standing platform and extension of the distance between the seat and the platform, as will be explained in more detail hereinafter.

In the alternative, rather than using the rail coupling member 21 to engage bottom part 18a and upper part 18b, respectively as well as using the rail coupling member 21 to engage 20a and 20b, respectively, as indicated in FIG. 16, bottom parts 18a and 20a can be elongated to the proper length as the rail coupling 21 and can be milled down so that end portion of bottom parts 18a and 20a a would slide inside of their respective upper parts 18b and 20b.

This is illustrated in FIG. 15 where there are no bolts 37a and 37b necessary to tie the rail coupling member 21 to either bottom parts 18a or 20a.

In that the bottom part 18a and upper part 18b are fashioned longer. as in adding the length of the coupling member 21 to the members bottoms parts 18a and 20a, and milling down the surfaces of ends 18a and 20a such that as illustrated in FIG. 16. The ends are integral and fit inside of the bottom ends of upper parts 18b and 20b, respectively. There may still be a need the for bolts 37a and 37b in the top end of the elements 18a and 20a, however the lower bolts are not required as seen in FIG. 16.

Figure 13:
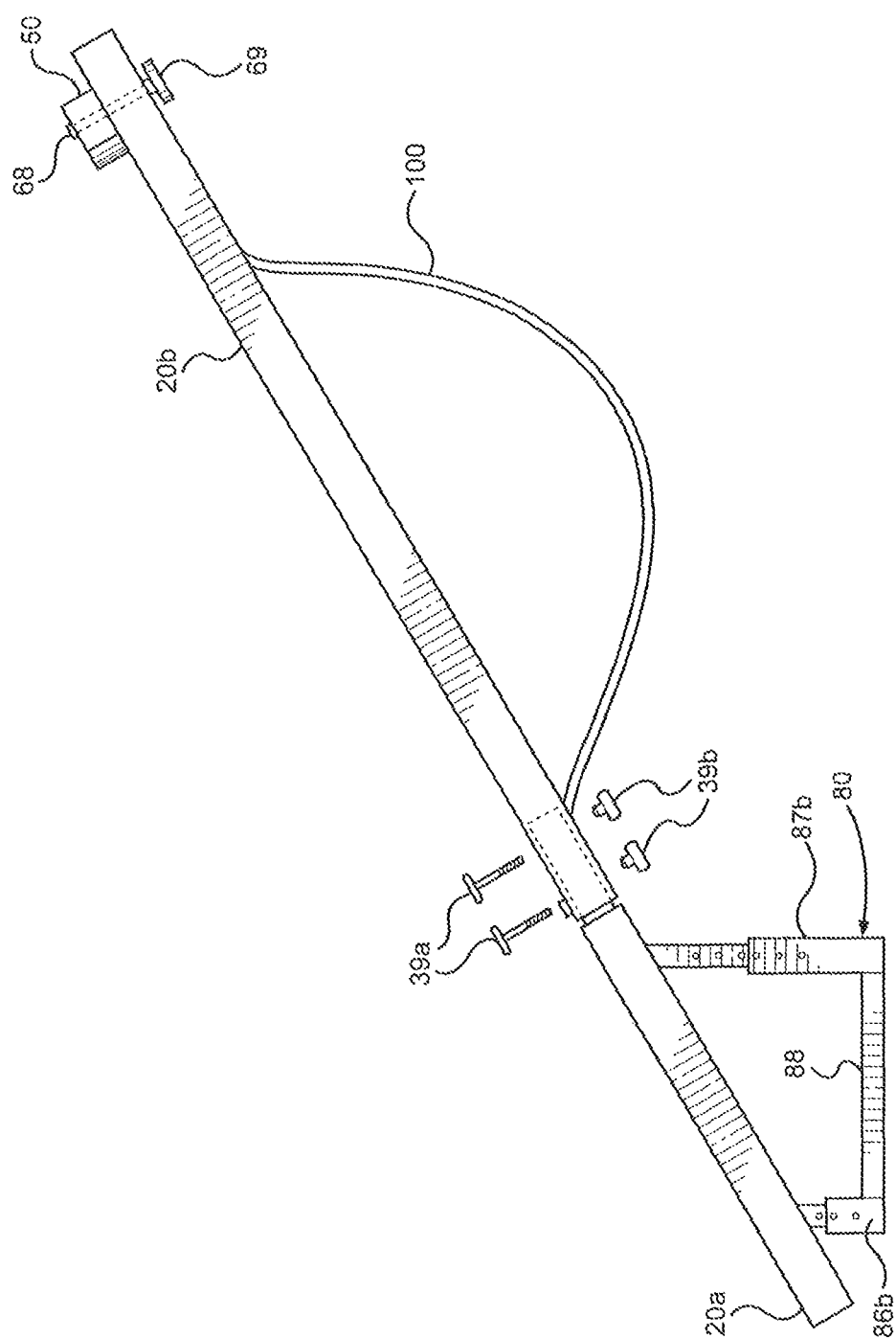
FIG. 13 is a side view of the tree stand assembly illustrating engagement of the side rail coupling member with the side rail.
Figure 14:
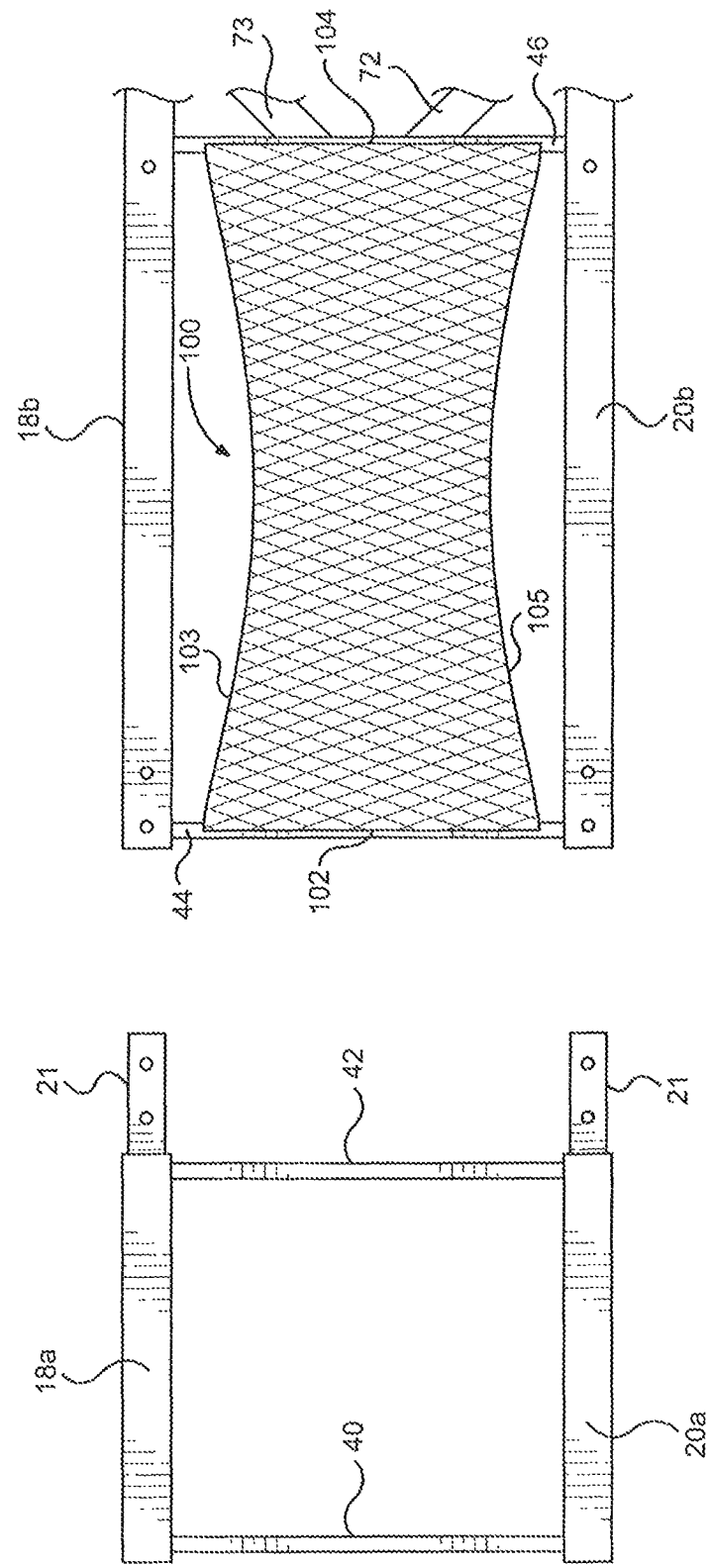
FIG. 14 is a top view illustrating engagement of the side rail coupling members with the side rails.

The reverse of this milling operation is also available namely the ends of 18a and 18b, can be elongated and milled down so that the ends would fit into 18a and 20a with the need of only one bolt 37a and 37b and 39a and 39 b respectively, as illustrated in FIG. 13, 14,15, 16, A bottom cross bar 40 connects lower portions of the rail parts 18a, 20a; a first intermediate cross bar 42 is secured adjacent open ends 36, 38 of the rail parts 18a, 20a a distance above the bottom cross bar 40. A second intermediate cross bar 44 is secured adjacent the open ends 35, 37 of the upper parts 18b, 20b of the rail members 18 and 20. A third intermediate cross bar 46 is secured to the rail parts 18b and 20b a distance from the second intermediate cross bar 44. The cross bars 40, 42, 44, 46 are affixed to the opposing rails 18, 20 by bolts, nails, or other mechanical means perpendicularly to the rails.

Figure 6:
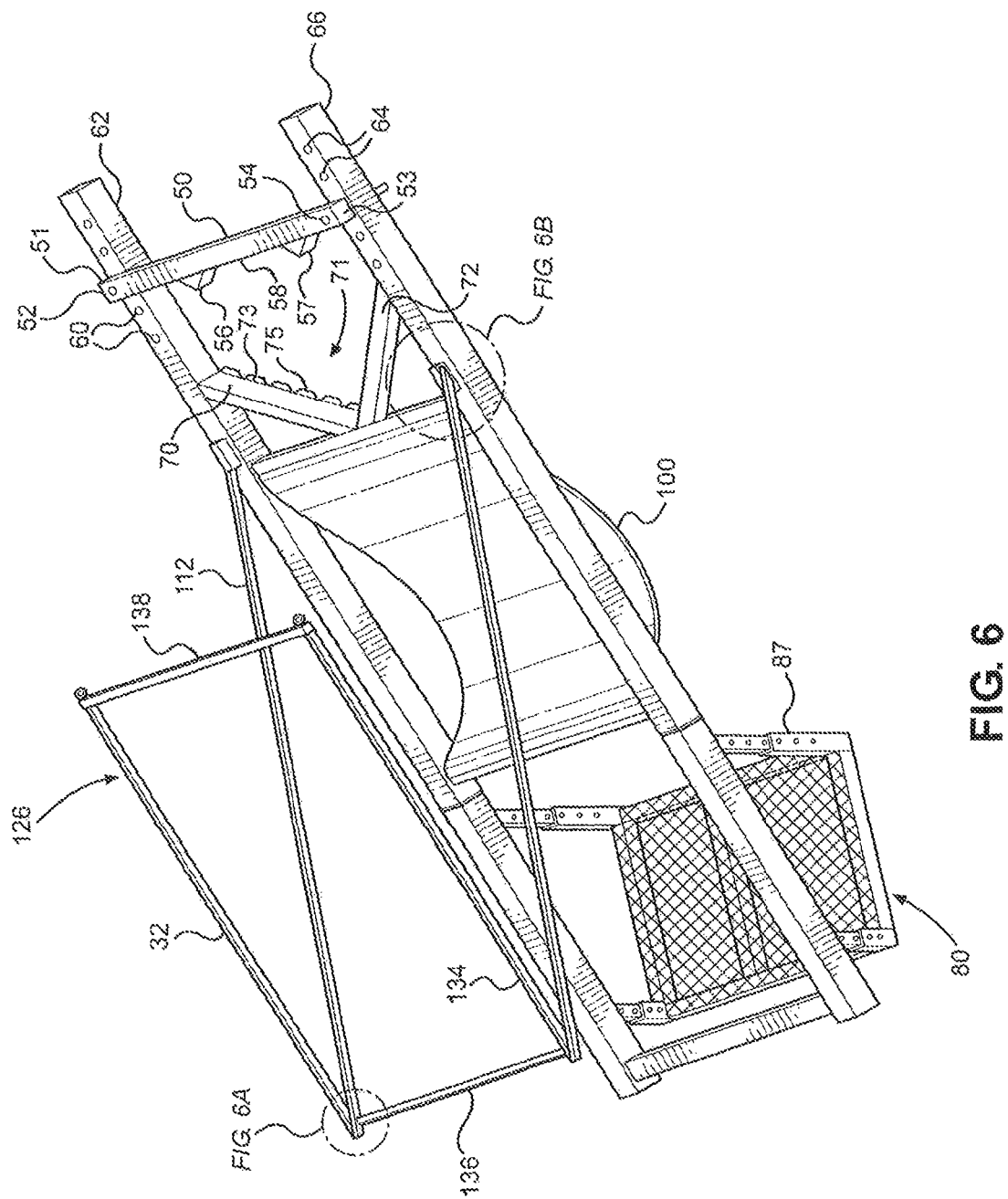
FIG. 6 is a perspective view of the tree stand assembly showing detail of a cover frame.

A detachable locking bar 50 is removably secured to the top portions of the rails 18, 20. In one aspect of the invention, the locking bar 40 overlaps the rails 18, 20, as can be seen in FIGS. 1 and 6. The locking bar 50 comprises an elongate beam provided with an aperture 52 at one of its ends 53 and an aperture 54—at its opposite end 53. The locking bar 50 can be configured as a parallelepiped with square or rectangular cross-section.

A pair of spaced wedges 56, 57 is secured on a contact surface 58 of the locking bar 50, the surface which faces the tree when the tree stand member 12 is in use. The wedges 56, 57 have a substantially triangular configuration, with apexes of the triangular wedges facing the tree. The wedges 56, 57 are designed to prevent shifting of the tree stand member 12 during use by creating strong friction between the wedges and the tree.

A plurality of axially aligned openings 60 is formed in the uppermost portion 62 of the rail part 18b. A corresponding number of aligned openings 64 are formed in the uppermost portion 66 of the rail part 20b. The aperture 52 is configured to align with any one of the openings 60 in the rail part 18b, while the aperture 54 is configured to align with any of the openings 64 of the rail part 20b when the locking bar 50 is engaged with the rails 18 and 20. Depending on the diameter of the tree trunk, the locking bar 50 can be moved up or down along the rails 18, 20.

Figure 7:
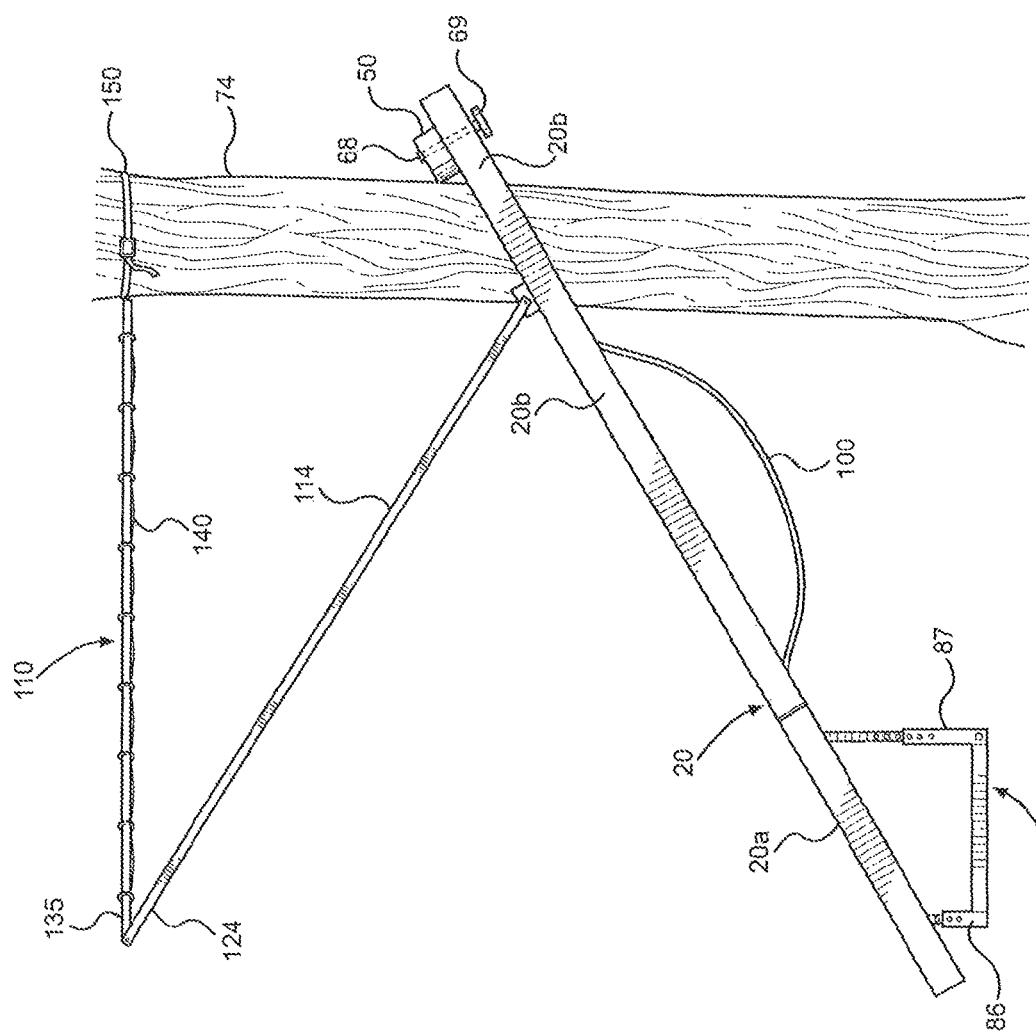
FIG. 7 is a side view of the trees stand assembly positioned on a tree trunk.

The assembly comprises a means for engaging the locking bar 50 with the rails 18 and 20. A locking bolt or locking pin 68 is configured to fit within the apertures 52, 54 and the openings 60, 64. The locking bolt or pin 68 carries a locking nut 69, which is engaged with one end of the locking bolt 68, on the underside of the rails 18, 20, as shown in FIG. 7. The locking nut 69 secures the bottom of the locking bolt 68 in the apertures 52, 54 and the openings 60, 64 while detachably affixing the locking bar 50 to the rails 18, 20. The locking bar 50 extends between and perpendicularly in relation to, the rails 18, 20.

The tree stand member 12 comprises a means for frictionally engaging a tree trunk, said means comprising a pair of tree engaging arms 70, 72 secured to the upper cross bar in parallel relationship to the locking bar 50. The tree-engaging arms 70, 72 are oriented at an acute angle to each other and form a V-shaped channel 71 for receiving a tree trunk 74 therein. Each of the tree engaging arms 70, 72 is secured to mid-section of the uppermost cross bar at one of its ends and to a respective rail 18 or 20 at its opposite end. A plurality of spaced teeth 73 is formed on a contact surface 75 of each of the tree engaging arms 70, 72.

When the tree stand member is engaged with the trunk of a tree 74, the locking bar 50 is moved into contact with the tree trunk 74, while the teeth 75 of the tree engaging arms 70, 72 and the wedges 56, 57 frictionally engage the tree trunk 74, stabilizing position of the tree stand member and preventing its lateral and vertical shifting during use. Depending on the diameter of the tree trunk 74, the locking bar 30 can be moved closer to the uppermost cross bar or farther away from it.

A lower portion of the tree stand member 12 carries a standing platform 80, which is suspended from the rails 18 and 20 in the area between the lower cross bar 40 and the first intermediate cross bar 42. The platform 80 comprises a planar step plate 82, which is affixed to the rail 18 by longitudinally adjustable attachment struts 84, 85, and to the rail 20 by longitudinally adjustable attachment struts 86, 87. The attachment struts 84, 85, 86, and 87 extend at a right angle to the rails 18, 20. In the preferred embodiment, the front attachment struts 84, 86 are shorter than the rear attachment struts 85, 87 so as to retain the step platform 80 generally parallel to the ground when the tree stand member 12 is positioned on the tree trunk 74.

Figure 2:
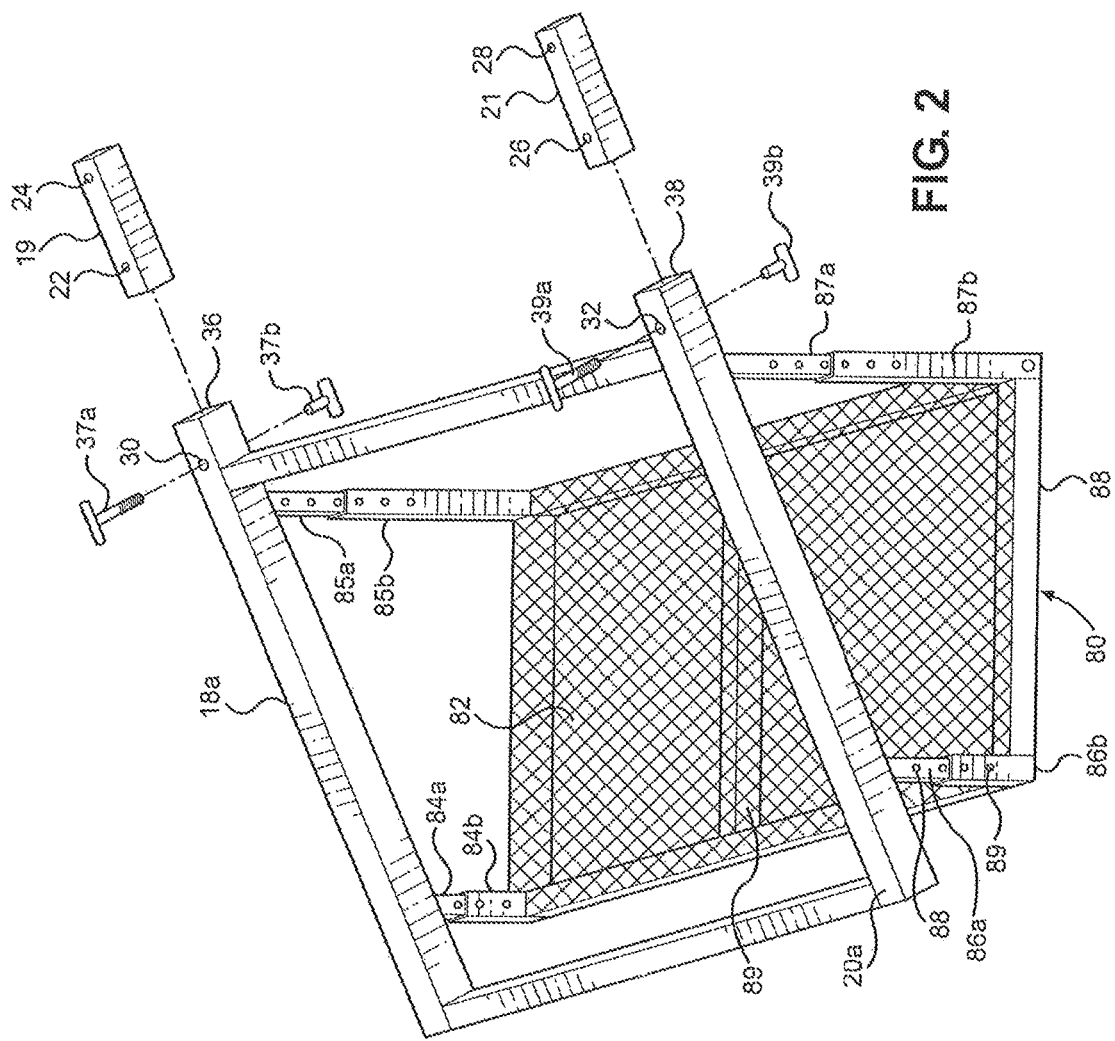
FIG. 2 is a detail perspective view of the adjustable standing platform of the present invention with a coupling member disengaged.
Figure 3:
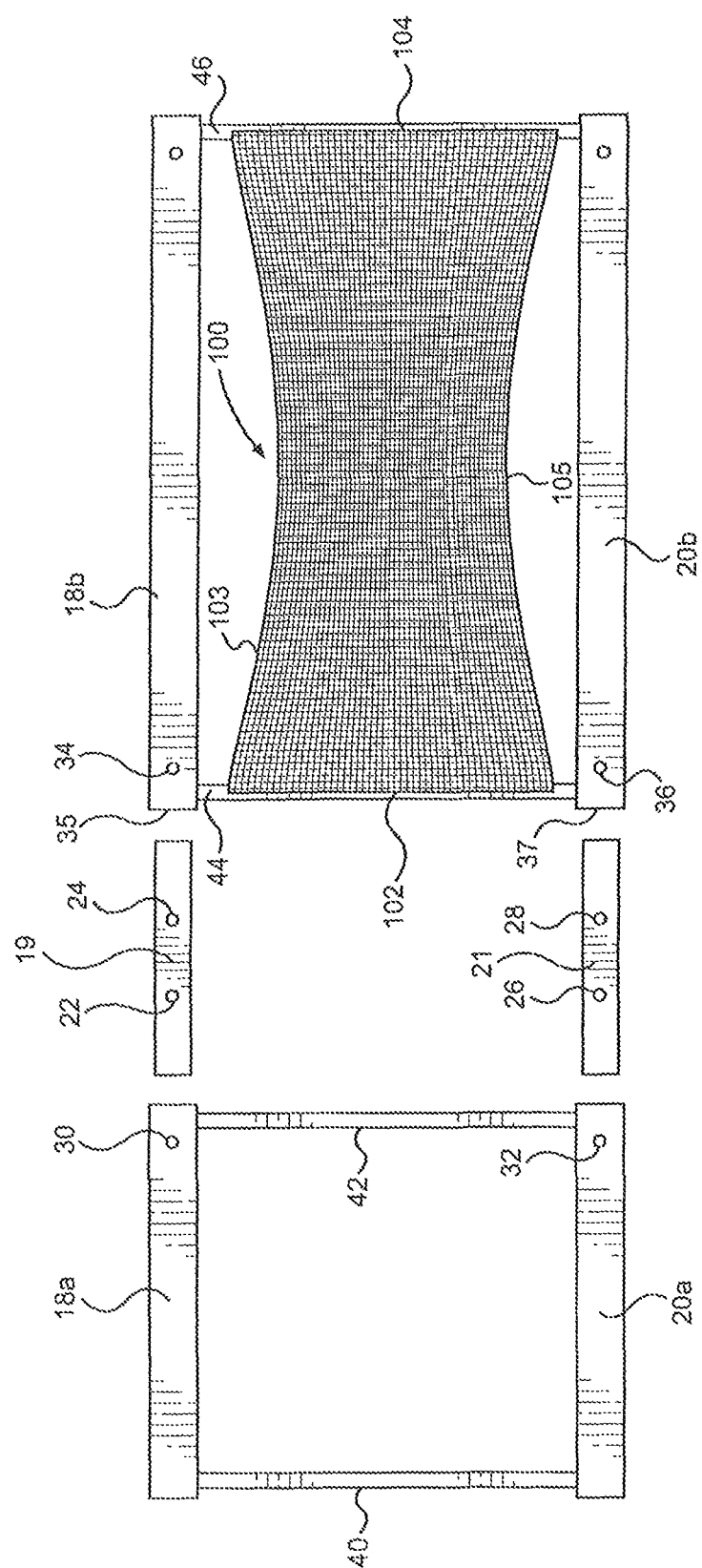
FIG. 3 is detail top view of the seat member and adjustable side rails.
Figure 4:
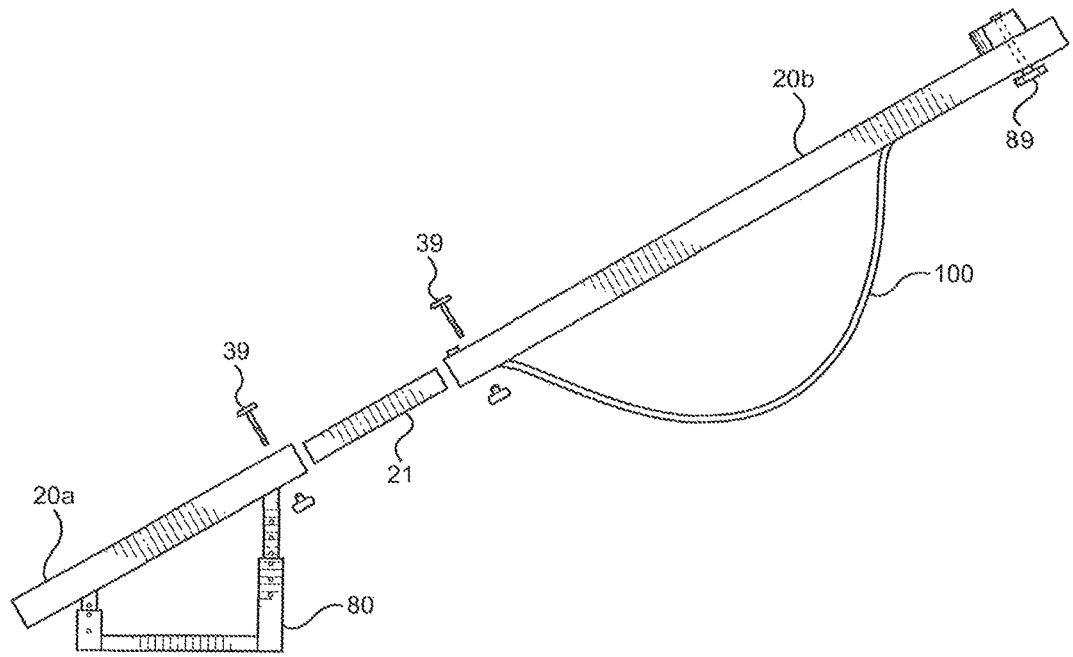
FIG. 4 is a detail side view of the adjustable side rails showing detail of the side rail coupling member.
Figure 5:
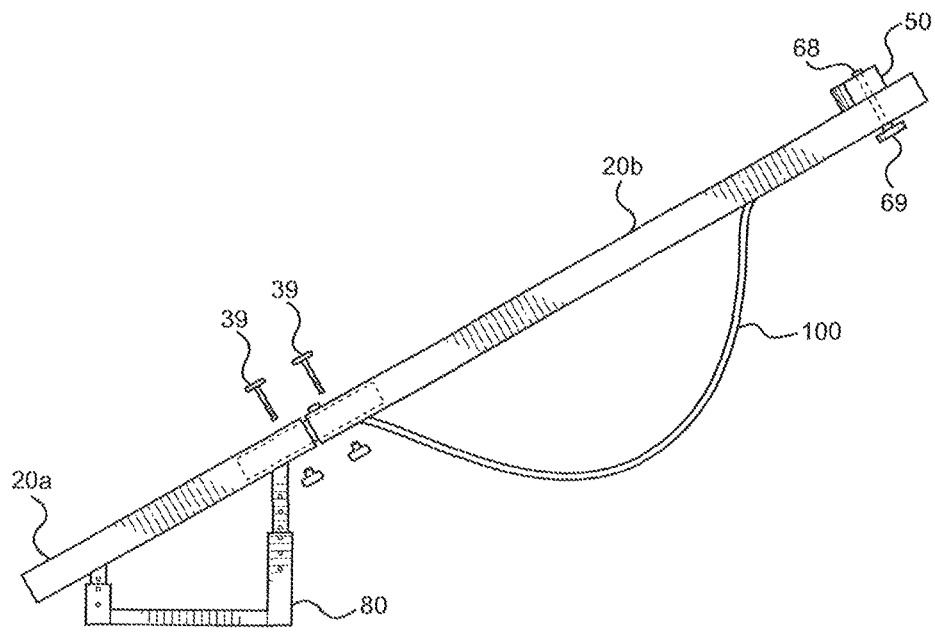
FIG. 5 is a detail side view of the adjustable side rails showing the coupling member engaged with the side rail.

It is envisioned that the step plate 82 can be made from a solid piece of wood, plywood, lightweight metal, etc. If desired, the step plate 82 can be formed from a segment of mesh material supported by a sturdy peripheral border 78 and that a reinforcement bar 89 can be attached under the mesh step plate 82, as shown in FIGS. 1 and 2. Alternatively, the platform step plate 82 can be formed with non-smooth upper surface to reduce a chance of the hunter slipping on the platform.

Figure 8:
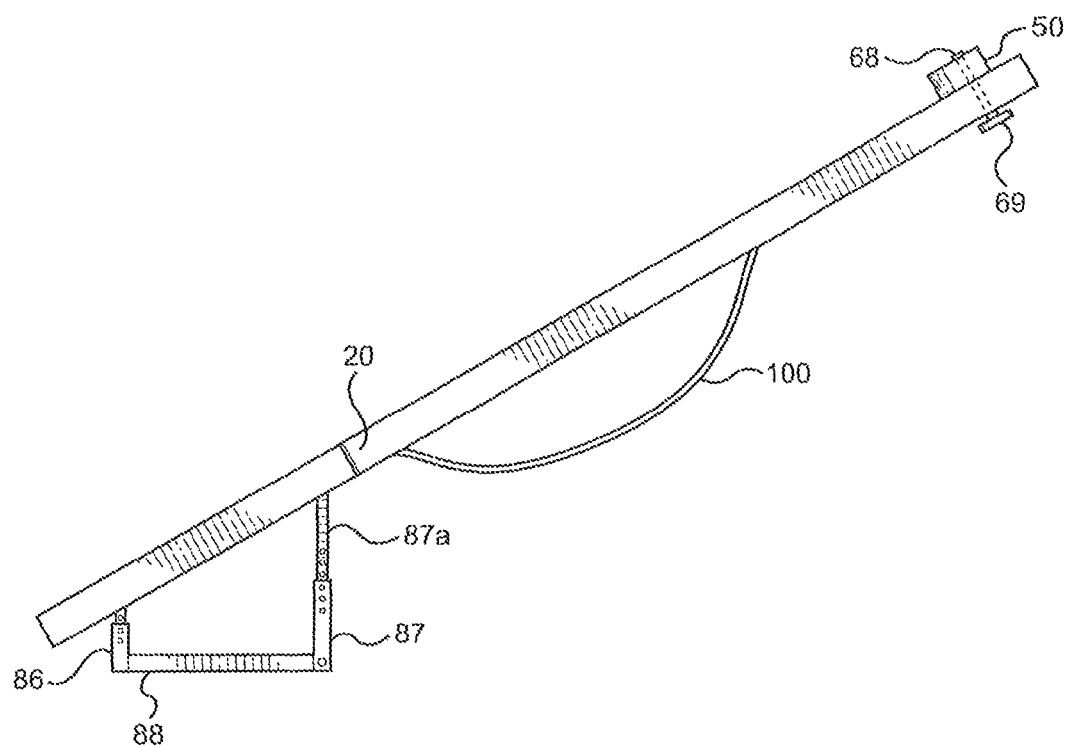
FIG. 8 is a detail side view of the tree stand assembly with adjustable standing platform.
Figure 9:
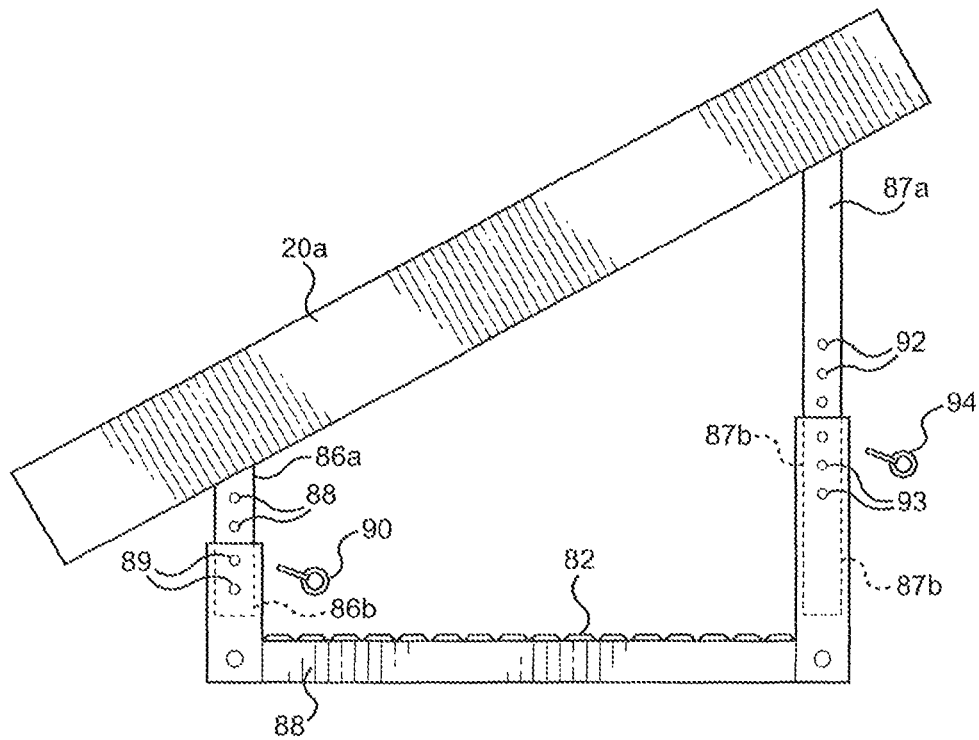
FIG. 9 is a detail side view illustrating vertical adjustability of the standing platform.

With a particular reference to FIGS. 8 and 9, the attachment struts 86 and 87 are shown in more detail. As can be seen in FIG. 8, the attachment struts 86 and 87 are in their non-extended position, while in FIG. 9, the adjustable bars are extended to lower the platform in relation to the rails 18, 20. Each attachment strut is formed as a two-part member with telescopically fitting parts. The attachment strut 86 has a first upper strut part 86a and a hollow lower strut part 86b, which receives the upper strut part 86a in a telescoping slidable relationship. A plurality of openings 88 is formed in the upper strut part 86a; a plurality of openings 89 is formed in the lower strut part 86b. A locking pin 90 is inserted through aligned openings 88 and 89 to secure the upper strut part 86a with the lower strut part 86b when the attachment strut 86 is of desired length.

A similar adjustability feature is provided for the attachment strut 87, which is comprised of two parts: an upper strut part 87a and a hollow lower strut part 87b, which receives the upper strut part 87a in a slidable telescoping relationship. The strut parts 87a and 87b are provided with openings 92 and 93, respectively. A locking pin 94 secures the extension of the upper strut part 97a from the lower strut part 87b. It will be understood that the attachment struts 84, 85 are mirror images of the attachment struts 86, 87 and are similarly vertically adjustable using telescopically movable parts 84a, 84b and 85a and 85b. As a result, the platform member 80 adjusts up and down the strut members to the users comfort range.

A seat member 100 is suspended between and is secured to the second intermediate cross bar 44 and the third intermediate cross bar 46. The seat member 100 has a flexible foldable seat portion that can be formed from a piece of flexible foldable material, natural or synthetic, such as for instance mildew-resistant fabric. As can be seen in the drawings, the seat member has a substantially rectangular configuration and is secured along a lower edge 102 and an upper edge 104 to the intermediate cross bars 44, 46, respectively. The sides 93, 95 of the seat member 100 remain unsecured, allowing a hunter to insert his legs in the space 96 between the rails and the sides 103, 105 of the seat member 100 when climbing up the tree 74 and descending therefrom.

Figure 6B:
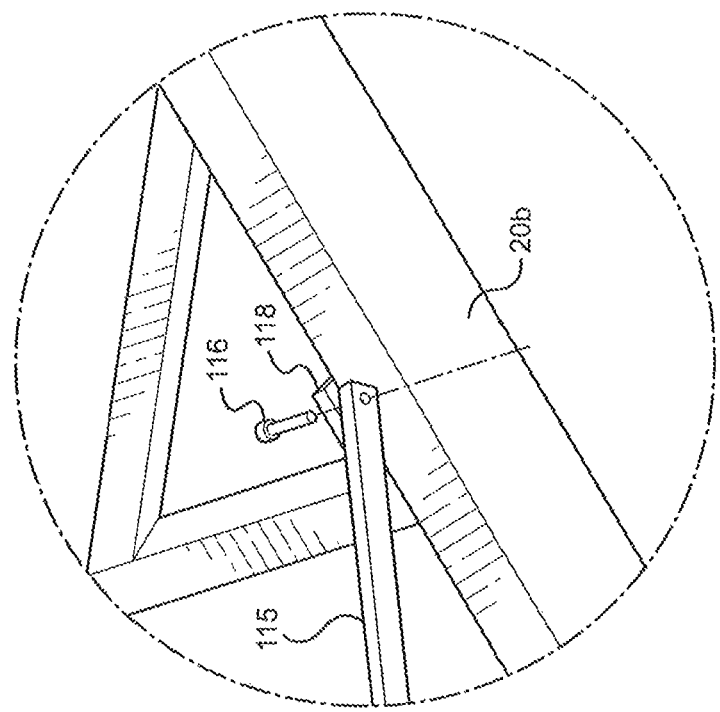
FIG. 6b is a detail view showing engagement of the canopy support arm to a side rail.

FIGS. 1, 6, 6a and 6b, and 7 illustrate a collapsible cover assembly 110 of the tree stand of the present invention. The cover assembly 110 comprises a pair of elongated braces 112, 114 attached via a hinge to the upper parts 18b and 20b of the rails 18 and 20. As can be seen in FIG. 6b, a pivot pin 116 secures a proximal end 115 of the brace 114 to a plate 118 affixed atop the upper rail part 20b. A similar pivot pin secures a proximal end 113 of the brace 112 to a plate 120, which is affixed atop of the upper rail part 18b. The pivot pins allow limited pivotal movement of the braces 112, 114 in relation to the rails 18 and 20.

Distant ends 122, 124 of the braces 112, 114, respectively carry a canopy frame 126. The canopy frame 126 comprises a rectangular-shaped member formed from elongated canopy frame bars 130, 132, 134, and 136 secured together to move as one unit. A flexible, moisture-impermeable cover 140 is suspended between the canopy frame bars and forms an awning above the seat ember 100 so as to protect a user seated in the tree stand from the elements. The cover 140 can be suspended from the canopy frame members using rings 142 and grommets 144 or the cover 140 can be attached to the canopy frame members by fasteners, stitching, etc.

Figure 6A:
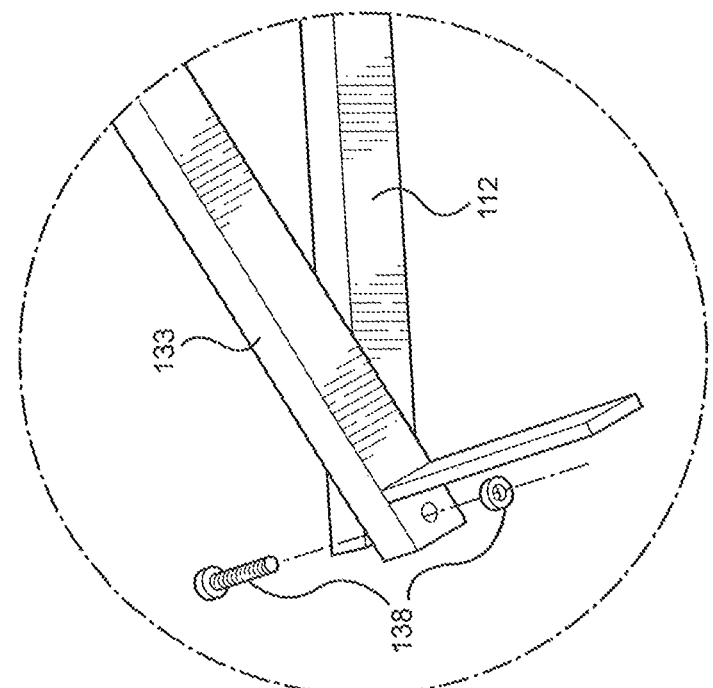
FIG. 6a is a detail view showing engagement elements of the canopy to a canopy support arm.

As can be seen in FIG. 6a, distant ends 133 and 135 of the canopy frame bars 134, 136 are pivotally attached by a bolt-and-nut unit 138 to the distant ends 122, 124 of the braces 112, 114. The canopy frame 126 can thus be raised in relation to the braces 112, 114 to a desired position over the seat 100. A rope or strap 150 is detachably secured to proximate ends 152, 154 of the of the cover frame bars 132, 134. When in use, the strap 150 is wrapped around the tree trunk 74 and secured thereto, thereby retaining the cover 140 at the desired angle in relation to the seat 100. As shown in FIGS. 1 and 7, the cover 140 extends somewhat horizontally in relation to the ground and the canopy frame 126 is oriented at an acute angle in relation to the braces 112, 114.

The canopy frame 126 pivots and collapses to the parallel rails 18, 20 for transportation and climbing. Once the desired height is reached the frame is pivoted up and the canopy rear cross member 138 is attached to the tree or pole with the strap 150. This secures the frame in the proper working position. Then the canopy material can be slid into place along the canopy side members to form the cover. The collapsible canopy further enhances the tree stand by allowing the user to remain on the tree stand in all weather conditions which is important in many types of hunting and surveillance.

FIG. 1 illustrates the tree climber member 14. As can be seen in the drawing, the tree climber member 14 comprises a pair of elongated parallel side bars 160, 162 and a pair of transverse bars 164, 166 extending at a right angle to the side bars 160, 162. A pair of angular braces 168, 170 is secured to the transverse bar 164 forming a V-shaped configuration.

A left foot engaging area 172 is formed by a portion of the side bar 160, a portion of the transverse bar 164 and the angular brace 168. A right foot engaging area 174 is formed between a portion of the side bar 162, a portion of the transverse bar 164 and the angular brace 170. When the hunter climbs up or down the tree 74, the hunter places his/her feet in the spaces 172, 174 and pushes against the angular braces 168, 170 to move the tree climber member 14 upwardly or downwardly.

A pair tree engaging angular braces 176, 176 is attached to the transverse bar 166. Similar to the V-shaped tree engaging arms 70, 72, the angular braces 176, 178 contact the tree 74 when the tree climber member 14 is in use.

The tree climber member 14 comprises a third transverse bar or climber locking bar 180 which is configured to detachably engage the side bars 160, 162 and contact the tree trunk 74 opposite the angular braces 176, 178. The side bars 160, 162 are provided with a plurality of spaced axially aligned openings 184, which allow the third climber locking bar 180 to be moved along the length of the side bars 160, 162.

Similar to the locking bar 50, the climber locking bar 180 has a pair of apertures configured to receive a securing bolt 186 therethrough. When the climber locking bar 180 is engaged with side bars 160, 162 the securing bolts 134 pass through the openings 184 and are engaged on the underside by locking nuts. A pair of spaced apart wedges 188 (only one wedge can be seen in FIG. 1) similar to the wedges 56, 57 stabilize position of the tree climber member 14 on the tree trunk 74.

A pair of flexible foldable collapsible straps 190, 192 is detachably secured to the second transverse brace 166 and to the third intermediate cross bar 46 to retain the tree climber member 14 with the tree stand member 12 when the assembly 10 is in use. Should the tree climber member 14 slide downwardly along the trunk, the straps 190, 192 prevent it from falling all the way to the ground and leaving the hunter stranded on the tree 74 without a means to climb down the tree.

Figure 10:
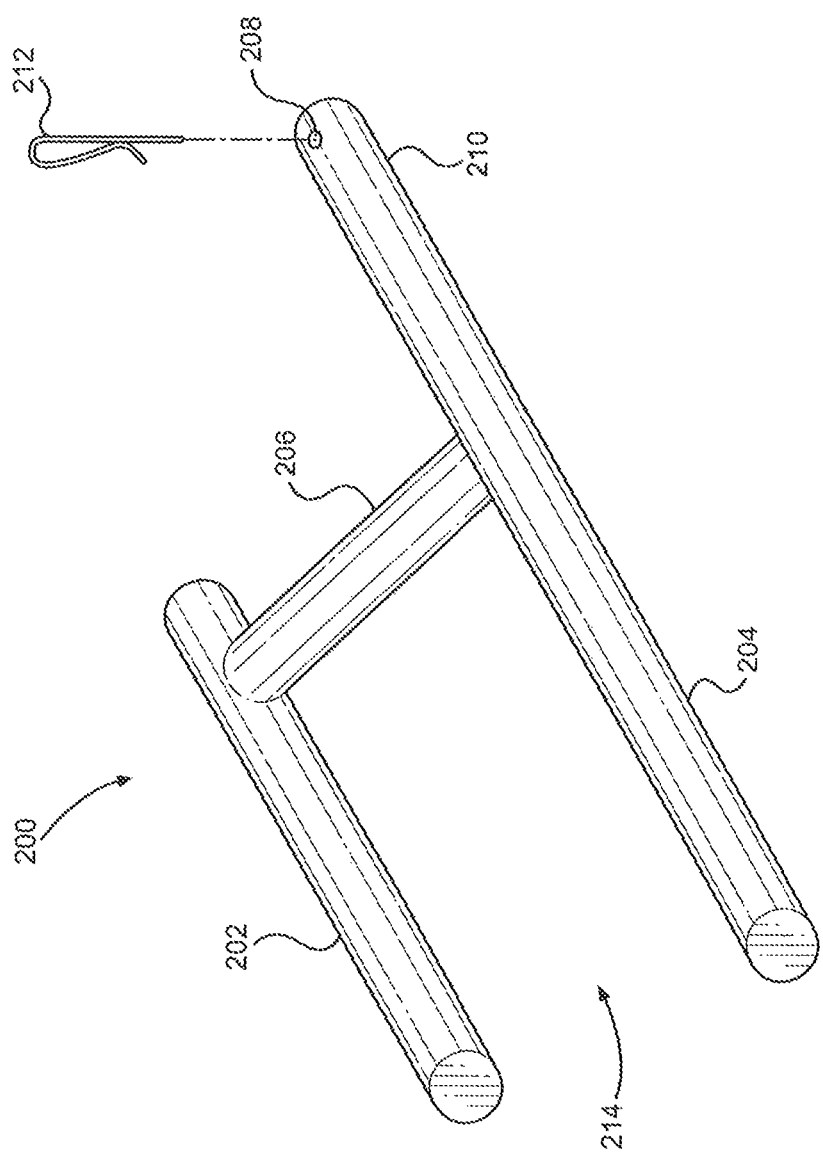
FIG. 10 is a detail perspective view of an archery bow holder.

With a particular reference to FIGS. 1, and 10-12c, a gun and an archery bow rest of the present invention can be seen in more detail. As shown in FIG. 10, the archery bow holder 200 comprises a pair of elongated legs 202, 204 connected by a cross leg 206. One of the holder legs is made shorter, in this embodiment the leg 204, and an opening 208 is formed in a securing end 210. A securing clip 212 is provided for inserting through the opening 208 after the holder 200 is positioned in the desired location on the rail.

The legs 202, 204 and the cross leg 206 form a U-shaped channel 214 sized and configured for receiving the archery bow therein.

Figure 11A:
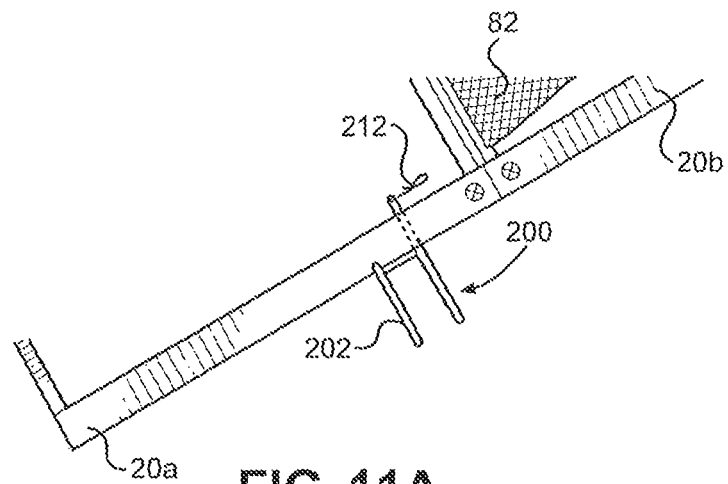
FIG. 11A is a detail view of the archery bow holder mounted on a side rail.
Figure 11B:
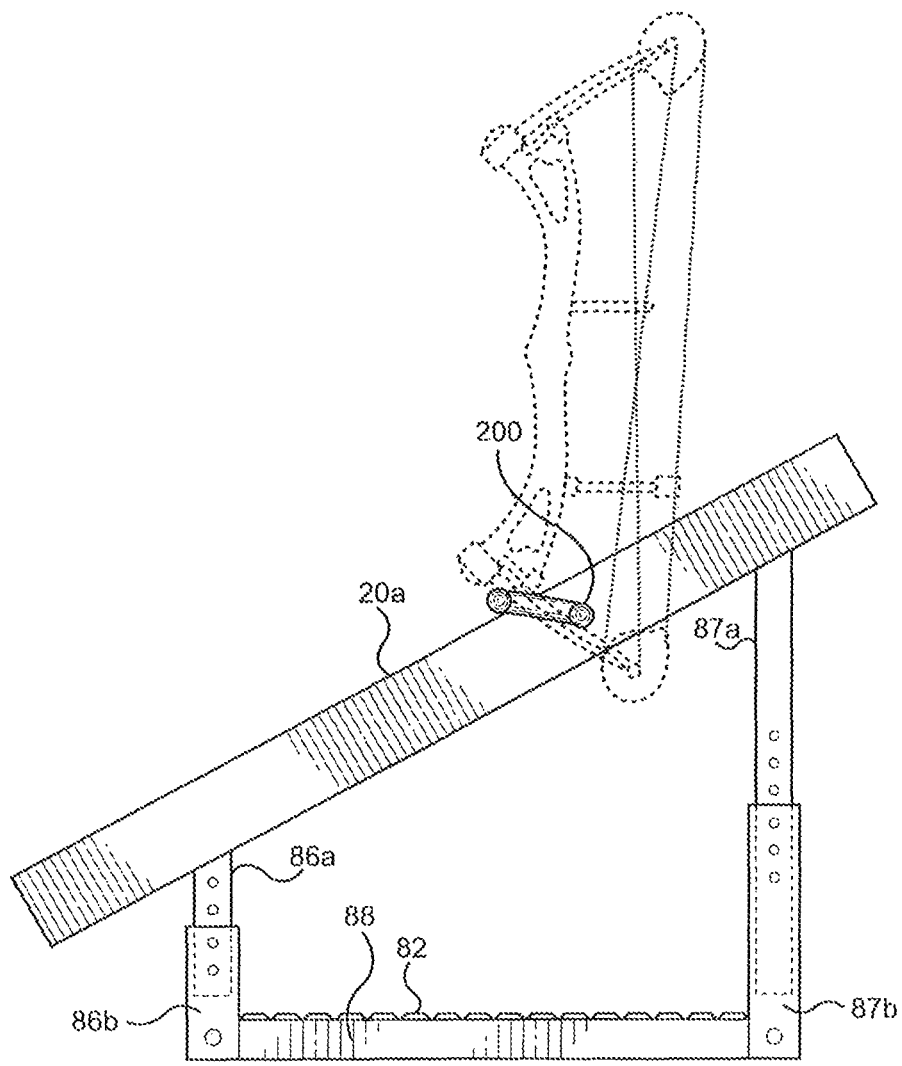
FIG. 11B is a detail view of the archery bow holder and its locking pin.
Figure 11C:
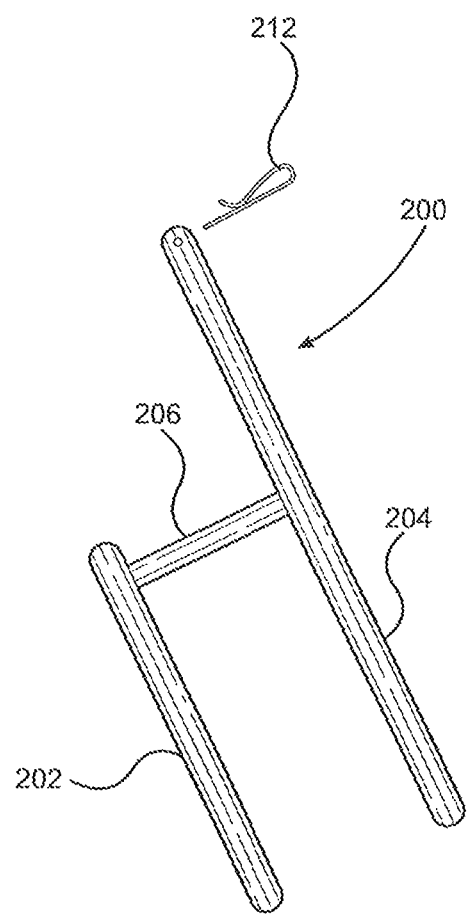
FIG. 11C is a detail top view of the archery bow holder.

FIGS. 11A and 11B illustrate the archery bow holder 200 secured to the lower part 20a of the rail 20. In order to mount the holder 200, an opening is formed in the rail part 20a and the longer leg 204 is inserted in the opening. The securing end 210 extends outwardly from the rail part 20a. The clip 212 is fitted through the holder opening 208 to thereby retain the archery bow holder in place on the rail 20. When not in use, the holder 200 can be removed by disengaging the pin 212 and sliding the leg 204 out of its engagement with the rail 20a. Of course, the holder 200 can be positioned on the rail 18 if desired.

The bow holder 200 can be made of two cylindrical shaped rods 202, 204 of varying lengths connected by a shorter length rod 206. One rod is long enough to pass through an opening through the side of the parallel side rail. The other rod is just long enough to sit on top of the side rail thus locking the bow holder 200 in place. The forked or U-shaped channel 214 accepts the lower limb of the bow and holds the bow to the side of the stand.

Figure 12A:
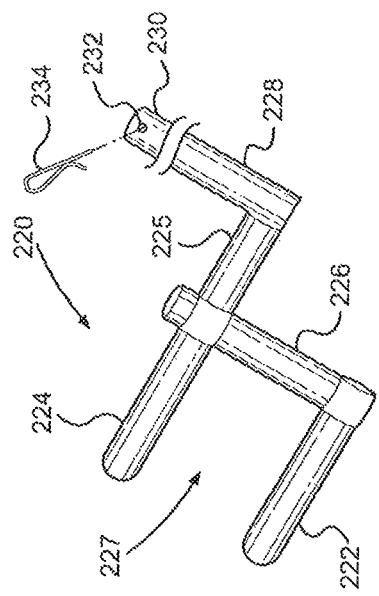
FIG. 12A is a detail view of a rifle holder installed on a side rail.
Figure 12B:
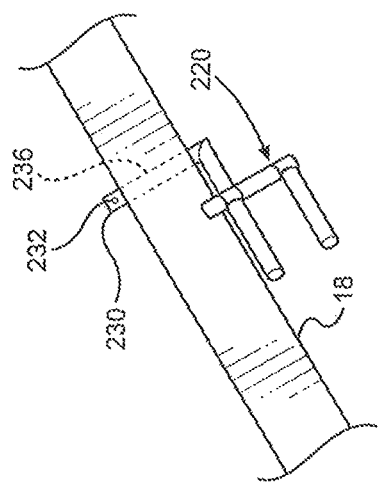
FIG. 12B is a detail view of the rifle holder.
Figure 12C:
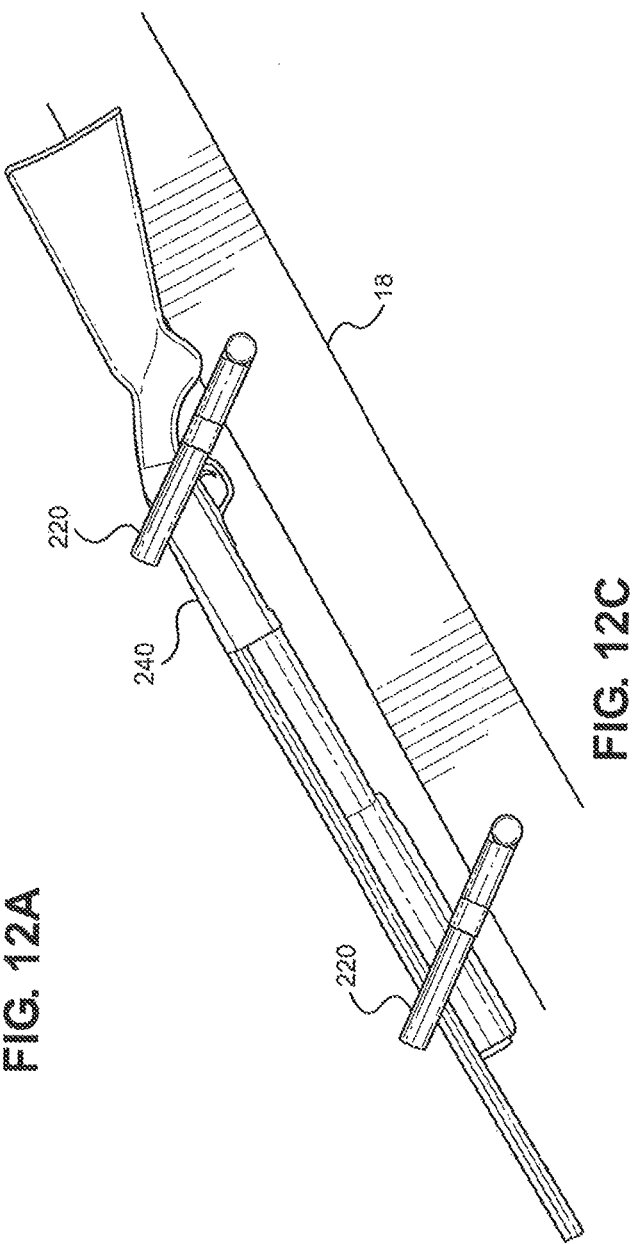
FIG. 12C is a detail view illustrating two rifle holders supporting a rifle.

The rifle holder or gun stand 220 of the present invention is shown in detail in FIGS. 12A through 12C. The present invention provides for two rifle holder units 220, each comprising a pair of parallel gun holder members 222, 224 retained in spaced apart relationship by a first transverse member 226. The gun holder member 224 is longer than the gun holder member 222. The gun holder member 222, the first transverse member 226 and a portion of the second gun holder member 224 define U-shaped channel 227 for receiving the rifle barrel or rifle stock therein.

A second transverse member 228 is attached to an end 225 of the longer gun holder member 224; the second transverse member 228 extends transversely to the longitudinal axes of the gun holder members 222, 224 and in parallel to the first transverse member 226. A securing end 230 of the second transverse member 228 is provided with a through opening 232. A securing clip 234 is provided for engaging the securing end 230 of the second transverse member 228. An opening 236 is made through the rail 18 to receive the second transverse member therethrough. The securing end 230 extends outwardly from the rail opening 236 (FIG. 12A), where it is engaged with the securing clip 234 (FIG. 12B) and prevents disengagement of the gun holder unit 220 mounted on the rail.

In the preferred embodiment, there are two gun holder units 220 detachably secured to the rail 18 in a spaced-apart relationship. As shown in FIG. 12C, a gun or rifle 240 is placed on the gun holder units 220, which retain the rifle within easy reach of the hunter. When not in use, the gun holder unit 220 can be stored separately from the tree stand assembly 10. The gun holder units 220 can be manufactured from cylindrical rods, if desired.

The tree stand assembly 10 is positioned on the tree as the user climbs the tree 74. The hunter positions the tree stand member on the tree 74 and adjusts location of the locking bar 50 to ensure tight frictional engagement of the teeth 75 and the wedges 56, 57 with the tree 74. The hunter then positions the tree climber member 14 below the tree stand member 12 and attaches the tree climber member 14 to the tree stand member 12 using straps 190, 192.

The hunter then uses the platform 80 to climb onto the tree stand member 12 and seats in the seat member 100 facing the tree 74. In this position, the hunter straddles the tree stand member 12 by inserting his legs between the side edges 103, 105 of the seat member 100 and the side rails 18, 20. The hunter then inserts toes of the hunting boots into the foot spaces 172, 174 moving the toes against the underside of the angular braces 168, 170.

Leaning against the tree stand member 12, the hunter moves the tree climber member 14 upwardly by pushing against the angular braces 168, 170. The hunter then moves his/her feet to stand on the tree climber member 14, while pulling the tree stand member 12 upwardly. The hunter then lowers into the seat 100 and uses his/her feet to move the tree climber member 14 higher along the tree trunk. The hunter repeats these steps until he/she reaches the desired height on the tree. The hunter then raises the cover assembly 110 and secures it to the tree trunk 74 using the rope 150.

The hunter then rotates his/her body and seats in the seat member 100 while resting his/her feet on the platform plate 82 or the bottom cross bar 40. In this position, the hunter's back is toward the tree 74. The hunter can stand on the platform 82, if desired to make a better shot or to simply change the position. The platform 80 being parallel to the ground supports the hunter in standing position. When descending from the tree 74, the hunter reverses the process described above.

The tree stand member 12 and the tree climber member 14 can be made from lightweight noncorrosive metal, such as aluminum. In one exemplary embodiment, the tree stand assembly 10 weighs less than thirty pounds and is easy to carry. The platform 80 can be used as a foot rest, as a place to rest a gun, a bow, or a backpack. Alternatively, the bow and the gun can be positioned on their respective holder and supported by the rails 18, 20. The tree stand assembly 10 can be easily and quickly disengaged from the tree by essentially reversing the procedure used for its installation. It may be appreciated that the tree stand assembly in accordance with the present invention is a much safer tree stand than any of its predecessors.

If desired, the bottom of the rails 18, 20 can be equipped with wheels to allow for easy transportation. It is envisioned that during manufacturing, the parallel rails 18, 20 can be milled to size to allow a fitted insertion and removal from the parallel rails of the seat section of the stand. The milled ends can be inserted into the parallel rails at the second intermediate cross bar of the seat section of the stand. The milled ends of the platform parallel rails have axially aligned openings which align with the axially aligned openings into the parallel rails near the second intermediate cross bar. Locking bolts secure the rails together to form the continuous parallel rails. This method of coupling allows the stand to be dismantled for optional means of transportation when not using the wheels.

The coupling members join the parallel rails together at a point between the seat and the platform. This in turn makes the parallel rails stronger for supporting a user while standing on the platform. This also aids in transportation and storage when the stand/assembly is not being used as a cart with the wheels attached. The assembly can be secured together with the flexible foldable straps for another optional configuration.

Many other changes and modifications can be made in the design of the present invention without departing from the spirit thereof. I, therefore, pray that my rights to the present invention be limited only by the scope of the appended claims.

I claim:

1. An apparatus for engaging trees and for supporting a person above the ground, comprising:
    a tree stand member comprising a main frame supporting a seat member, a standing platform suspended on the main frame below the seat member, the platform capable of supporting a user in a standing position, a canopy assembly pivotally secured to the main frame and configured to extend above the seat member, and a gun holder assembly detachably mounted on a rail, the gun holder assembly comprising a pair of gun holder units securable to the rail in a spaced apart relationship, gun holder units comprising a pair of parallel gun holder members of different lengths retained in spaced apart relationship by a first transverse member and defining U-shaped channel for receiving a rifle barrel or rifle stock therein, wherein the longer of the gun holder members is detachably inserted into an aperture formed in a rail such that a securing end of the longer gun holder member extends outwardly from the rail, and wherein the holder unit comprises a clip for engaging the securing end of the longer gun holder member thereby preventing disengagement of the gun holder unit from the rail.

2. An apparatus for engaging trees and for supporting a person above the ground, comprising:
    a tree stand member comprising a main frame comprising a pair of elongated parallel rails, a bottom cross bar secured to bottom ends the rails, and a detachable locking bar secured to upper ends of the rails, each of said parallel rails comprising a bottom part having a distant end and proximate end, an upper part having a distant end and a proximate end, and a coupling member slidably telescopically engageable with a proximate end of the bottom part and the distant end of the upper part, coupling members of each of the parallel rails allowing longitudinal adjustment of the parallel rails;
    a seat member supported by the main frame;
    a standing platform suspended on the main frame below the seat member, the platform capable of supporting a user in a standing position;
    a collapsible canopy assembly pivotally secured to the main frame and configured to extend above the seat member;
    an archery bow holder detachably securable to the main frame; and
    a pair of gun holder units detachably securable to the main frame, wherein each of the gun holder units comprises a pair of parallel gun holder members of different lengths retained in spaced apart relationship by a first transverse member and defining U-shaped channel for receiving a rifle barrel or rifle stock therein, and wherein the longer of the gun holder members is detachably inserted into an aperture formed in a rail such that a securing end of the longer gun holder member extends outwardly from the rail, and wherein the holder unit comprises a clip for engaging the securing end of the longer gun holder member thereby preventing disengagement of the gun holder unit from the rail.

* * * * *